Oct. 2, 1928.
E. B. MEYER
1,686,243
SNOWPLOW
Filed April 28, 1926
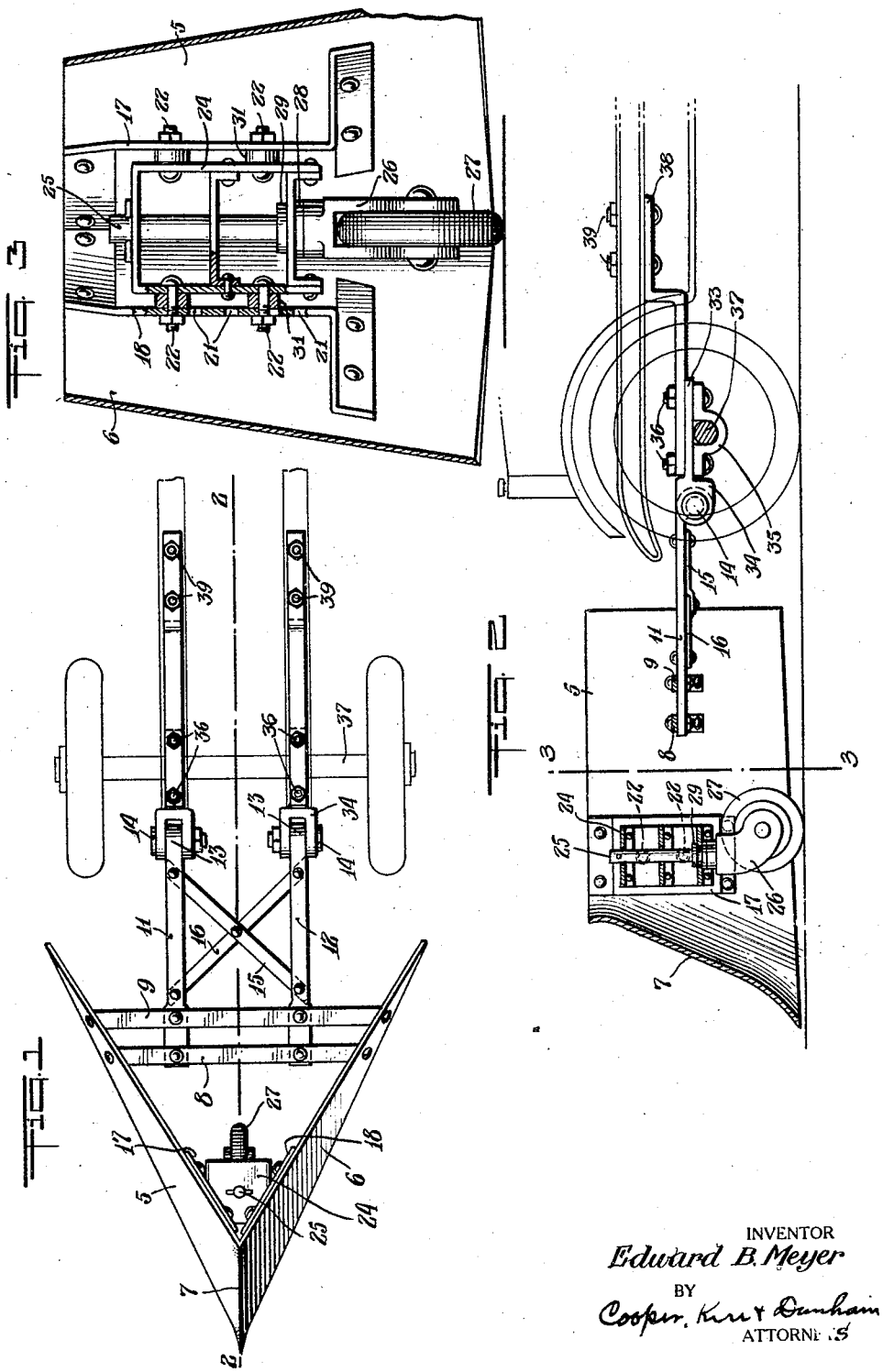
INVENTOR
Edward B. Meyer
BY
Cooper, Kerr & Dunham
ATTORNEYS Patented Oct. 2, 1928.

1,686,243

UNITED STATES PATENT OFFICE.

EDWARD B. MEYER, OF NEWBURGH, NEW YORK.

SNOWPLOW.

Application filed April 23, 1926. Serial No. 105,047.

This invention relates to snow plows and has particular reference to snow plows of the kind which are adapted to be driven by means of an automobile.

One object of the invention is to provide an apparatus of the kind mentioned which may readily be attached to an automobile and which can be driven and maneuvered conveniently without throwing a great strain on said automobile.

Incidental objects are to provide a construction whereby the plow may be adjusted to different heights with respect to the ground surface thereby relieving some of the strain which would be otherwise placed on the machine if an attempt was made to plow all of a deep snow aside at one operation, and to provide a simple arrangement for making the connection between the plow and the automobile. The connection to which reference has just been made is so constructed that, after an automobile has once been equipped with certain parts, the plow may be readily connected and disconnected without having to do more than insert or remove certain hinge pins or bolts.

With the foregoing and other objects in view the invention consists in certain novel features of construction and combinations of parts, the essential features of which are set forth in appended claims and a preferred form of embodiment of which is hereinafter described with reference to the drawings which accompany and form a part of the specification.

In said drawings:

Fig. 1 is a top plan view of one of the improved apparatuses, with some of the parts of an automobile shown in light lines, and illustrates one method of attaching the plow to the automobile.

Fig. 2 is a vertical section on the line 2—2 of Fig. 1.

Fig. 3 is a vertical section on the line 3—3 of Fig. 2.

The improved plow may have a snow engaging face or faces of any desired shape or configuration, but it is preferred to use the construction shown in the drawings, i. e., a pair of snow engaging faces diverging from a point or angle and curved so as to form mold boards serving to throw the snow aside. These faces are designated by the numerals 5 and 6 and the point or angle between the faces by the numeral 7, said angle being inclined rearward as shown.

The sides 5 and 6 are held in their relative positions by cross bars 8 and 9 which also give a certain amount of ridigity to the snow engaging apparatus as a whole. Attached to the bars 8 and 9 are bars 11 and 12 having their ends 13 formed to provide eyes (not shown in full outline) to receive hinge pins or bolts 14 referred to again later on. The bars 11 and 12 are connected by crossed reinforcing struts 15 and 16.

Attached to the inner sides of the snow engaging portions 5 and 6 of the plow are plates 17 and 18, suitably formed to bring portions thereof into parallelism. The parallel portions of said plates are each provided with a series of holes 21 which are adapted to receive bolts 22. Supported by the bolts 22 is a rectangular reinforced frame 24 in which is journaled a shaft 25 provided at its lower end with a forked member 26 in which is rotatably mounted a wheel 27. The upper shoulder 28 of the forked member 26 rests against a thrust bearing 29 mounted in or on one of the cross bars of the frame 24 so as to form a support for the weight of the plow.

The bolts 22 and the holes 21 provide a way of regulating the height of the snow engaging portions of the plow with respect to the ground, thereby making it possible to relieve the automobile from undue strain by adjusting the plow so that two or more trips over the path to be cleared may be made, a portion of the snow being removed at each of the trips. Spacing collars 31 surrounding the bolts 22 serve to hold the rectangular frame 24 in correct position with respect to the side plates 17 and 18. The collars 31 may, of course, be attached permanently to the frame 24 and/or the frame 24 may be provided with holes like the holes 21 if a greater capacity for adjustment is needed than is afforded only by the holes 21.

The advantage in mounting the wheel 27 as described is that it is thereby permitted to turn easily in any direction like a caster when the automobile is turned around curves and the like, as the wheel 27 will both support the weight of the plow and permit the plow to be guided by the automobile in any direction desired by the driver without throwing a great deal of strain on the connections or upon the automobile itself.

In the form shown in the drawings, the connections for attaching the plow to the automobile comprises elements 33 having forked heads 34 spanning the ends 13 of the bars 11 and 12. These forked heads are provided with suitable holes to receive the bolts 14 which, as previously stated, pass through eyes in the heads 13 of the bars 11 and 12. Associated with each of the elements 33 is a clamping member 35. Bolts 36 cause the members 35 to cooperate with elements 33 to clamp said elements upon the front axle 37 of an automobile. Usually this clamp connection is sufficient for the purpose, but, if desired, a reinforcing bar 38 may be used, said bar being attached by bolts 39 to the chassis frame. If such reinforcing bars are used, the bolts 35 used to draw the members 33 and clamping elements 35 into clamping relation may be made long enough so as to engage the reinforcing bars 38.

In equipping an automobile for use in driving the snow plow, the members 33 and 34 will be bolted or clamped in position and the reinforcing bars 38 attached in case such bars are used. These parts are then left attached to the machine. When it becomes necessary to use the plow it may be attached simply by inserting the bolts 14 to make the connection between the plow and the automobile.

The members 33 are preferably of such length that the forked heads 34 thereof come within the front line of the wheels, so that they will not give the automobile an unsightly appearance or be in the way when left permanently attached.

It is obvious, of course, that the improved plow is not necessarily limited to use with the automobile but may be attached to power driven lawn mowers, tractors and the like and it is equally obvious that, by a corresponding change in the parts, the plow may be connected directly to the chassis frame or to some other suitable part of an automobile instead of being clamped to the front axle.

In the foregoing description reference has been made to the details of the construction, but it is not the desire to be limited to such details except as they are included in the claims which follow.

What I claim is—

1. A snow plow attachment for motor driven vehicles comprising a pair of mold boards diverging from a cutting angle, of devices for reinforcing the mold boards, connections between said devices and the motor vehicle comprising a pair of hinges arranged to permit vertical movement of the mold boards relative to the vehicle, a frame adjustable within the mold boards to hold said boards at different heights, and a single caster wheel mounted on said frame and supporting the weight of said frame, the mold boards and the reinforcing devices.

2. A snow plow mechanism for motor driven vehicles comprising a set of connection elements permanently attached to the vehicle within the front line of the front vehicle wheels, a snow engaging portion comprising a pair of oppositely turned mold boards, a frame within and vertically adjustable relative to the mold boards and connected to said boards, a shaft rotatable on a vertical axis in said frame, a ground engaging element pivotally supported by the lower end of the shaft, connection elements rigid with the mold board and adapted to cooperate with the connection elements attached to the vehicle, and means comprising removable bolts for connecting the two groups of connection elements whereby to form hinge connections between the snow plow and the vehicle.

3. A snow shovel attachment for motor driven vehicles comprising a pair of mold boards diverging at equal angles from a cutting line, a single ground engaging caster supporting the mold boards near the cutting angle thereof, a frame adjustable relative to the mold boards and supporting the caster whereby to hold the mold boards at different heights from the ground, and connections between the plow and the vehicle comprising side bars and hinge connections permitting vertical movement of the plow relative to the vehicle.

In testimony whereof I hereto affix my signature.

EDWARD B. MEYER.